US006588570B2

(12) United States Patent
Negishi

(10) Patent No.: US 6,588,570 B2
(45) Date of Patent: Jul. 8, 2003

(54) BILL VALIDATOR

(75) Inventor: Hiroyuki Negishi, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/833,683

(22) Filed: Apr. 13, 2001

(65) Prior Publication Data

US 2001/0030100 A1 Oct. 18, 2001

(30) Foreign Application Priority Data

Apr. 14, 2000 (JP) ....................................... 2000-113578

(51) Int. Cl.[7] ................................................. G06K 7/00
(52) U.S. Cl. ...................................................... 194/207
(58) Field of Search ........................... 194/207; 250/556

(56) References Cited

U.S. PATENT DOCUMENTS 5,430,664 A * 7/1995 Cargill et al. ............... 194/207
5,465,821 A * 11/1995 Akioka ....................... 194/207
5,485,907 A * 1/1996 Chang ........................ 194/203
5,547,061 A * 8/1996 Itako et al. ................. 194/203
5,758,759 A * 6/1998 Negishi ...................... 194/207
6,012,565 A * 1/2000 Mazur ........................ 194/207
6,269,995 B1 * 8/2001 Rich et al. .................... 226/17
6,382,618 B1 * 5/2002 Takada .................... 271/10.01

* cited by examiner

*Primary Examiner*—Kathy Matecki
*Assistant Examiner*—Michael J. Kwon
(74) *Attorney, Agent, or Firm*—Banner & Witcoff, Ltd.

(57) ABSTRACT

In a bill validator (1) which includes a bill inlet (3) through which a bill (2) is inserted, a transfer path (4) arranged behind the inlet and connected to the inlet, a transferring mechanism (11, 10) for transferring the bill in the transfer path, a validating unit (18–20) for validating the bill on a predetermined validating position of the transfer path, and an optical detecting section (5), the optical detecting section includes a light emitting portion (7) for emitting a light beam, a transmission light guide (8) having a light input portion (8*a*) supplied with the light beam from the light emitting portion and a light output portion (8*b*) for outputting the light beam inputted through the light input portion, and a light receiving portion (9) for receiving the light beam from the light output portion. The light input and the light output portions of the transmission light guide are faced to the light emitting portion and the light receiving portion, respectively, with a first position of the transfer path interposed between the light input portion of the transmission light guide and the light emitting portion and with a second position of the transfer path interposed between the light output portion of the transmission light guide and the light receiving portion. The second position of the transfer path is different from the first position of the transfer path. Preferably, the first and the second positions of the transfer path are nearer to the bill inlet than the predetermined validating position of the transfer path.

12 Claims, 5 Drawing Sheets

BILL VALIDATOR

CROSS-REFERENCE TO RELATED APPLICATION

This application is based upon and claims the benefit of priority from Japanese Patent Application Number 2000-113578, filed Apr. 14, 2000, the entire contents of which are hereby incorporated by reference.

BACKGROUND OF THE INVENTION

This invention relates to a bill validator for use in a vending machine or the like and, in particular, to an optical detecting section of the bill validator.

For example, a related bill validator has a structure illustrated in FIG. 1. In the bill validator 100, a paper currency bill or bank note 101 is inserted through a bill inlet 102 and sent to an insertion detecting section 105 comprising a light emitting element 103 and a light receiving element 104 and arranged behind the bill inlet 102. The light emitting element 103 is energized by an emission power supply 106 and emits a light beam towards the light receiving element 104. The light receiving element 104 receives the light beam after it is attenuated in luminous energy through the bill 101. Thus, the insertion of the bill 101 is detected by the light receiving element 104 as the attenuation in luminous energy. When the insertion of the bill 101 is detected, a controller 107 delivers a forward operation signal to a reversible driver 109 to rotate a transfer motor 108 in a forward direction so that the bill 101 is transferred inward, i.e., in a bill accepting direction by a transfer belt 110. When a forward end of the bill 101 reaches a magnetic head 111 and an optical validating sensor 114 comprising a light emitting element 112 and a light receiving element 113, detection signals are produced by the magnetic head 111 and the light receiving element 113 of the optical validating sensor 114. The detection signals are supplied to an amplifier circuit 115 to be amplified into amplified detection signals. The amplifier circuit 115 delivers the amplified detection signals to an A/D converter 116. The A/D converter 116 converts the amplified detection signals into digital detection signals and supplies the digital detection signals to a validating unit 117. The validating unit 117 starts acquisition of bill data given by the digital detection signals. The acquisition of the bill data is continuously carried out until a rear end of the bill 101 is transferred to a position right under the light receiving element 117 of the optical validating sensor 114. After the acquisition of the bill data is completed, the validating unit 117 judges whether the bill 101 is valid or invalid. In addition, the validating unit 117 calculates an average of luminous energy transmitted through the bill 101 and received by the light receiving element 113. If the average of luminous energy is smaller than a predetermined reference level, the validating unit 117 judges "overlapped", i.e., the state in which two bills being overlapped are inserted.

If the validating unit 117 judges "invalid" or "overlapped", the controller 107 delivers a reverse operation signal to the reversible driver 109 to rotate the transfer motor 108 in a reverse direction so that the bill 101 is transferred outward, i.e., in a bill dispensing direction by the transfer belt 110. The transfer motor 108 continues the reverse rotation until the bill 101 escapes from the insertion detecting section 105 or until a time out occurs.

If the validating unit 117 judges "valid", the controller 107 delivers a valid bill signal to an external apparatus (not shown) and waits a storage request signal or a return request signal from the external apparatus.

The above-mentioned bill validator 100 is disadvantageous in the following respects. As described above, if the validating unit 117 judges "invalid" or "overlapped", the controller 107 delivers the reverse operation signal to the reversible driver 109 to rotate the transfer motor 108 in the reverse direction so that the bill 101 is transferred by the transfer belt 110 in the bill dispensing direction. However, since the judgment of "overlapped" is made at a later stage after the rear end of the bill 101 reaches the optical validating sensor 114, the bill 101 tends to be jammed in a transfer path. The transfer motor 108 continues the reverse rotation until the bill 101 escapes from the insertion detecting section 105 or until the time out occurs. If the bill 101 is removed from the bill validator 100 at a later time instant, the transfer motor 108 is excessively rotated. In this state, the bill 101 may be returned to a position beyond a clamping force between the transfer belt 110 and the guide roller 118 to be released and fallen out from the bill validator 100.

Upon judgment of "overlapped", use is made of the reference level which is preliminarily determined at an appropriate value in an initial condition of the bill validator 100. If the optical validating sensor 114 as an optical section is deteriorated, comparison with the predetermined reference level becomes difficult. This inhibits a proper operation of the bill validator 100.

SUMMARY OF THE INVENTION

It is therefore an object of this invention to provide a bill validator capable of reliably judging "overlapped" in an early stage to prevent a bill from jamming and from being released and fallen out from the bill validator if the bill is transferred in a dispensing direction.

It is another object of this invention to provide a bill validator capable of readily updating a reference level for use in judgment of "overlapped" to an optimum value.

According to this invention, there is provided a bill validator comprising a bill inlet through which a bill is inserted, a transfer path arranged behind the inlet and connected to the inlet, a transferring mechanism for transferring the bill in the transfer path, a validating unit for validating the bill on a predetermined validating position of the transfer path, and an optical detecting section comprising a light emitting portion for emitting a light beam, a transmission light guide having a light input portion supplied with the flight beam from the light emitting portion and a light output portion for outputting the light beam inputted through the light input portion, and a light receiving portion for receiving the light beam from the light output portion, the light input and the light output portions of the transmission light guide being faced to the light emitting portion and the light receiving portion, respectively, with a first position of the transfer path interposed between the light input portion of the transmission light guide and the light emitting portion and with a second position of the transfer path interposed between the light output portion of the transmission light guide and the light receiving portion, the second position of the transfer path being different from the first position of the transfer path.

DESCRIPTION OF THE PREFERRED EMBODIMENTS

Figure 1:
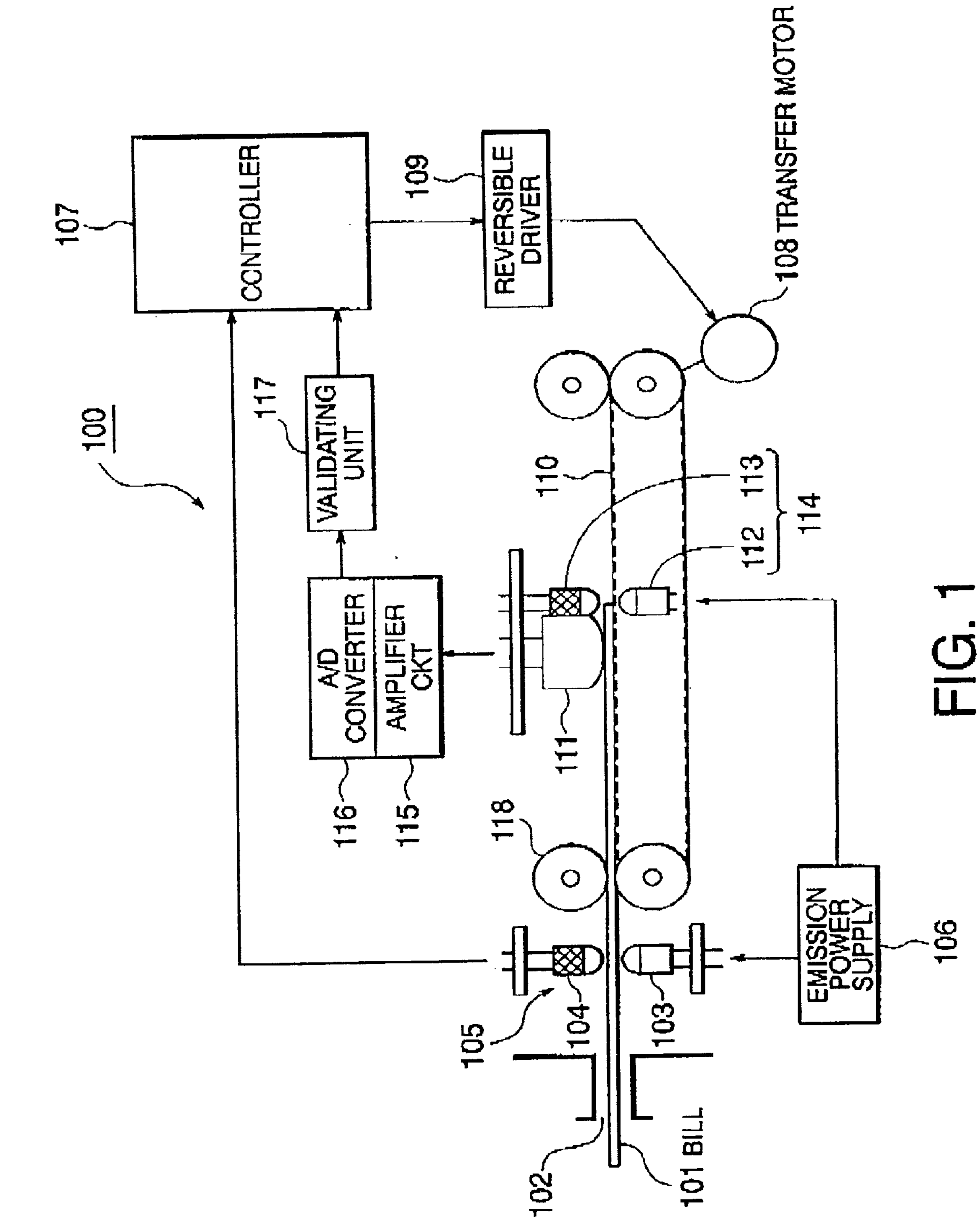
FIG. 1 shows a structure of a related bill validator.

Now, description will be made of several preferred embodiments of this invention with reference to the drawing.

Figure 2A:
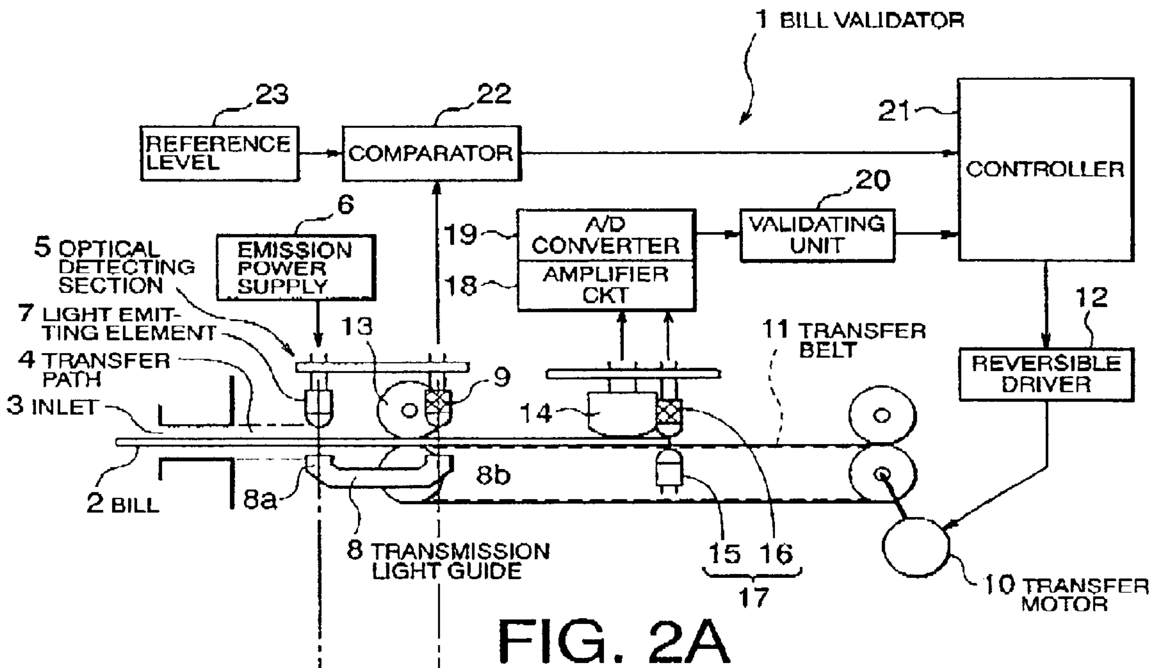
FIG. 2A shows a bill validator according to a first embodiment of this invention.
Figure 2B:
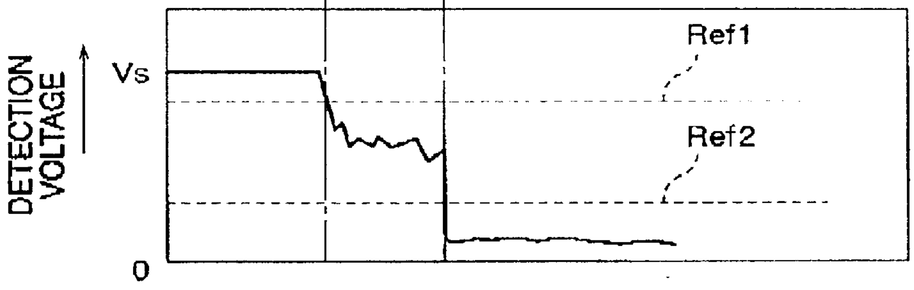
FIG. 2B shows a characteristic chart representing a transition of a transmission light detection voltage in a normal state.
Figure 2C:
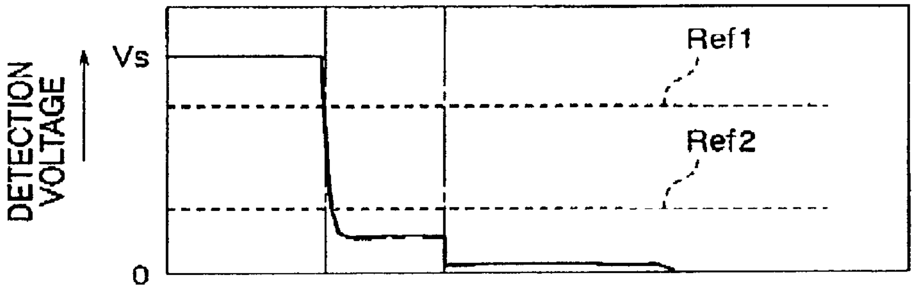
FIG. 2C is a view similar to FIG. 2B but in an overlapped state.

Referring to FIGS. 2A through 2C, a bill validator 1 according to a first embodiment of this invention will be described. In FIG. 2A, a bill 2 is inserted through an inlet 3. The inlet 3 is connected to a bill transfer path 4 located behind the inlet 3. The bill transfer path 4 is provided with bill insertion detecting means. In this embodiment, the bill insertion detecting means comprises an optical detecting section 5 as a characteristic part of this invention. The optical detecting section 5 comprises a light emitting element 7 as a light emitting portion for emitting a light beam when energized by an emission power supply 6, a transmission light guide B having one end provided with a light input portion 8*a* for inputting the light beam from the light emitting element 7 and the other end provided with a light output portion 8*b* for outputting the light beam inputted through the light input portion 8*a*, and a light receiving element 9 for receiving the light beam from the light output portion 8*b*. The light emitting element 7 and the light receiving element 9 are spaced from each other in a bill transfer direction (horizontal direction in FIG. 2A). The light input portion 8*a* and the light output portion 8*b* of the transmission light guide 8 are faced to the light emitting element 7 and the light receiving element 9, respectively, with the transfer path 4 interposed therebetween. For example, the transmission light guide 8 can be implemented by an optical fiber.

Behind the transfer path 4, a transfer belt 11 as bill transfer means is disposed. The transfer belt 11 is driven by a transfer motor 10 to be circulated. In response to an instruction from a reversible driver 12, the transfer motor 10 is rotated in a forward direction (i.e., a bill accepting direction) or a reverse direction (i.e., a bill dispensing direction). At a bill entry start position from which the bill 2 enters to the transfer belt 11, a guide roller 13 is provided. The bill 2 can be transferred in the accepting direction or the dispensing direction by cooperation of the guide roller 13 and a start end of the transfer belt 11. As seen in the bill accepting direction along which the bill 2 enters to the transfer belt 11, the guide roller 13 and the start end of the transfer belt 11 are arranged at a position coincident with or immediately before the locations of the light receiving portion 9 and the light output portion 8*b*.

In the middle of the transfer bet 11, a magnetic head 14 and an optical validating sensor 17 comprising a light emitting element 15 and a light receiving element 16 are arranged in the manner similar to the device illustrate in FIG. 1. The magnetic head 14 and the light receiving element 16 of the optical validating sensor 17 produce detection signals which are supplied to an amplifier circuit 18 to be amplified into amplified detection signals. The amplifier circuit 18 delivers the amplified detection signals to an A/D converter 19 to produce digital detection signals. The A/D converter 19 delivers the digital detection signals as bill data to a validating unit 20 for judging whether the bill 2 is valid or invalid. The validating unit 20 delivers a judgment result signal to a controller 21. Supplied with a comparison result signal from a comparator 22 and the judgment result signal from the validating unit 20, the controller 21 produces an operation signal which is delivered to the reversible driver 12. The comparator 22 is supplied with a detection voltage signal from the light receiving element 9 and compares the detection voltage signal with a predetermined reference level 23 to produce the comparison result signal which is supplied to the controller 21.

In the bill validator 1, in a standby state where the bill 2 is not yet inserted, the light beam emitted from the light emitting element 7 passes through the transmission light guide 8 without being attenuated by the bill 2 to reach the light receiving element 9. At this time, a transmission light detection voltage detected by the light receiving element 9 as the detection voltage signal has a saturation voltage level Vs as illustrated in FIG. 2B.

In an insertion start state where the bill 2 is inserted inward from a position right under the light emitting element 7, the light beam emitted from the light emitting element 7 is attenuated through the bill 2 and then passes through the transmission light guide 8 to reach the light receiving element 9. At this time, the transmission light detection voltage is set to a half voltage level equal to about ½ of the saturation voltage level Vs. The half voltage level is lower than a first reference level Ref1 and higher than a second reference level Ref2. The first reference level Ref1 is selected between the saturation voltage level Vs and the half voltage level. The second reference level is selected between the half voltage level and a nearly zero voltage level. By the use of the first and the second reference levels Ref1 and Ref2, the comparator 22 detects the above mentioned state and the controller 21 judges that the bill 2 is inserted.

Consideration will be made of the case where two bills being overlapped are inserted or any undesired paper, such as thick paper, is inserted. In this event, when the two bills being overlapped or the undesired paper is inserted inward from the position right under the light emitting element 7, the light beam emitted from the light emitting element 7 is attenuated more than usual and passes through the transmission light guide 8 to reach the light receiving element 9. At this time, the transmission light detection voltage drops down from the saturation voltage level Vs immediately to a level lower than the second reference level Ref2 as illustrate in FIG. 2C without experiencing the half voltage level as illustrated in FIG. 2B. If this state is reached before the transfer motor 10 is rotated forward, "overlapped" is detected or insertion of an abnormal object, such as an invalid or counterfeit bill or any undesired paper, other than a valid bill is judged. Then, the bill validator 1 maintains the standby state.

If the bill 2 is normally inserted, the controller 21 supplies a forward operation signal to the reversible driver 12 to rotate the transfer motor 10 in the forward direction. The transfer motor 10 drives the transfer belt 11 to transfer the bill 2 inward in the bill accepting direction. When the bill 2 reaches a position right under the light receiving element 9, the light beam emitted from the light emitting element 7 is attenuated first through the bill 2 at the position right under the light emitting element 7, passes through the transmission light guide 8, is attenuated again through the bill 2 at the position right under the light receiving element 9, and reaches the light receiving element 9.

At this time, the transmission light detection voltage is lower than the second reference level Ref2 as illustrated in FIG. 2B. The comparator 22 detects that the forward end of the bill 2 is securely clamped by the guide roller 13 on the transfer belt 11 of the transfer path.

The forward end of the bill 2 reaches the magnetic head 14 and the optical validating sensor 17 comprising the light emitting element 15 and the light receiving element 16. The magnetic head 14 and the light receiving element 16 produce the detection signals which are supplied to the amplifier circuit 18 to be amplified into the amplified detection signals. The amplifier circuit 18 delivers the amplified detection signals to the A/D converter 19 to produce digital detection signals. The A/D converter 19 delivers the digital detection signals as the bill data to the validating unit 20. Thus, the validating unit 20 acquires the bill data. Acquisition of the bill data are continued until the rear end of the bill 2 reaches a position right under the light receiving element 16 of the optical validating sensor 17. After completion of the acquisition, the validating unit 20 judges whether the bill 2 is valid or invalid.

If the bill 2 is judged "valid" as a result of judgment, the controller 21 delivers a valid bill signal to an external apparatus (not shown) and waits a storage request signal or, in case of no exchange, a return request signal from the external apparatus.

If the return request signal is received in the above-mentioned state or if "invalid" is detected as a result of judgment the controller 21 delivers a reverse operation signal to the reversible driver 12 to rotate the transfer motor 10 in the reverse direction. Under control of the controller 21, the transfer motor 10 is driven by the reversible driver 12 to be rotated in the reverse direction so that the bill 2 is transferred back in the dispensing direction. When the bill 2 reaches the position right under the light receiving element 9, the transmission light detection voltage is lower than the first reference level Ref1 and higher than the second reference level Ref2. The comparator 22 transmits bill position information to the controller 21. The controller 21 delivers a stop signal to the reversible diver 12 to stop the transfer motor 10. At this time, the transfer motor 10 stops its rotation after a small delay under the action of inertia so that the bill 2 is stopped at a stop position where the end of the bill 2 can be lightly clamped between the transfer belt 11 and the guide roller 13. In this state, the bill 2 is prevented from being fallen out.

Summarizing the bill validator illustrated in FIG. 2A, the bill validator includes a bill inlet (3) through which a bill (2) is inserted, a transfer path (4) arranged behind the inlet and connected to the inlet, a transferring mechanism for transferring the bill in the transfer path, a validating unit (18–20) for validating the bill on a predetermined validating position of the transfer path, and an optical detecting section (5). The optical detecting section (5) includes a light emitting portion (7) for emitting a light beam, a transmission light guide (8) having a light input portion (**8*a*) supplied with the light beam from the light emitting portion and a light output portion (8*b*) for outputting the light beam inputted through the light input portion, and a light receiving portion (9**) for receiving the light beam from the light output portion. The light input and the light output portions of the transmission light guide are faced to the light emitting portion and the light receiving portion, respectively, with a first position of the transfer path interposed between the light input portion of the transmission light guide and the light emitting portion and with a second position of the transfer path interposed between the light output portion of the transmission light guide and the light receiving portion. The second position of the transfer path is different from the first position of the transfer path.

More specifically, the first and the second positions of the transfer path are nearer to the bill inlet than the predetermined validating position of the transfer path.

The light receiving portion detects as a transmission light beam the light beam transmitted through the bill to produce a detection voltage signal representative of a transmission light detection voltage. The optical detecting section is designed so that the transmission light detection voltage has a maximum voltage level in a standby state where the bill is not yet inserted, an intermediate voltage level in a first stage where the transmission light beam passes through the bill once, and a minimum voltage level in a second stage where the transmission light beam passes through the bill twice. The intermediate voltage level is lower than the maximum voltage level and higher than the minimum voltage level. The bill validator further includes a detecting and judging portion (22, 23) for detecting and judging the maximum voltage level, the intermediate voltage level, and the minimum voltage level.

An overlapped state is judged if it is detected that the maximum voltage level in the standby state is immediately followed by the minimum voltage level without experiencing the intermediate voltage level when the bill is inserted in the transfer path through the bill inlet.

The first position of the transfer path is nearer to the bill inlet then the second position of the transfer path. In this case, the second position of the transfer path may be coincident with the predetermined validating position of the transfer path. In this event, the validating unit (18–20) is for validating the bill on the second position of the transfer path on the basis of an output signal of the light receiving portion (9) without using the output signal of the optical validating sensor 17.

Figure 3A:
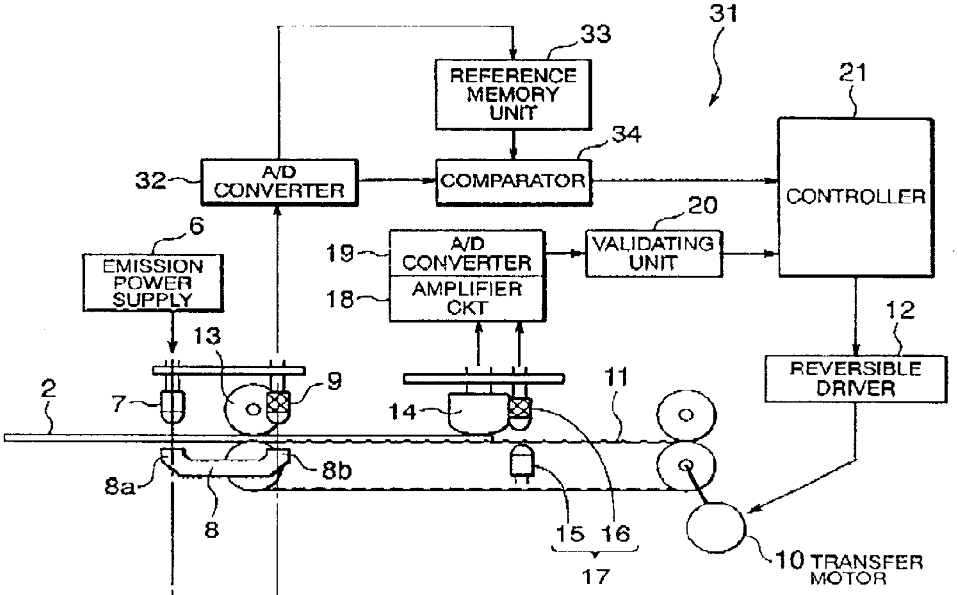
FIG. 3A shows a bill validator according to a second embodiment of this invention.
Figure 3B:
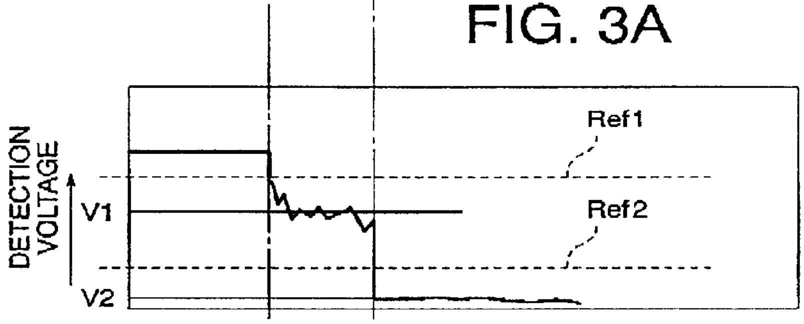
FIG. 3B shows a characteristic chart representing a transition of a transmission light detection voltage in a normal state.

Referring to FIGS. 3A and 3B, a bill validator 31 according to a second embodiment of this invention will be described. As illustrated in FIG. 3A, the light receiving element 9 delivers a detection signal representative of a transmission light detection voltage to an A/D converter 32. The A/D converter 32 converts the detection signal into a digital detection signal. The digital detection signal is sent to a reference memory unit 33 to be memorized therein and is sent to a comparator 34 to be compared with each reference level which is set at that time. The reference levels can be updated appropriately.

Specifically, when the bill 2 is inserted into the bill validator 31 comprising the A/D converter 32 and the reference memory unit 33, the reference levels are updated in the following manner. Referring to FIG. 3B, an average V1 of the transmission light detection voltage is calculated for a period during which the forward end of the bill 2 moves from the position right under the light emitting element 7 to the position right under the light receiving element 9. On the other hand, an average V2 of the transmission light detection voltage is calculated for another period during which the forward end of the bill 2 moves from the position right under the light receiving element 9 to a position where the acquisition of the bill data is completed. The second reference level Ref2 is updated as follows.

$$Ref2=(V1+V2)/2$$

Herein, the second reference level Ref2 is updated every time when the validation is carried out alternatively, the second reference level Ref2 may be updated in case where the following condition is satisfied for each of 10 times of insertion.

$$Ref2>(V1+V2)/2 \text{ or}$$

$$Ref2<(V1+V2)/2$$

By appropriately updating the reference level, a proper reference level can be selected in dependence upon the current status even if the optical section is deteriorated by aging. In other respects, the second embodiment is similar in structure, operation, and effect to the first embodiment.

Figure 4:
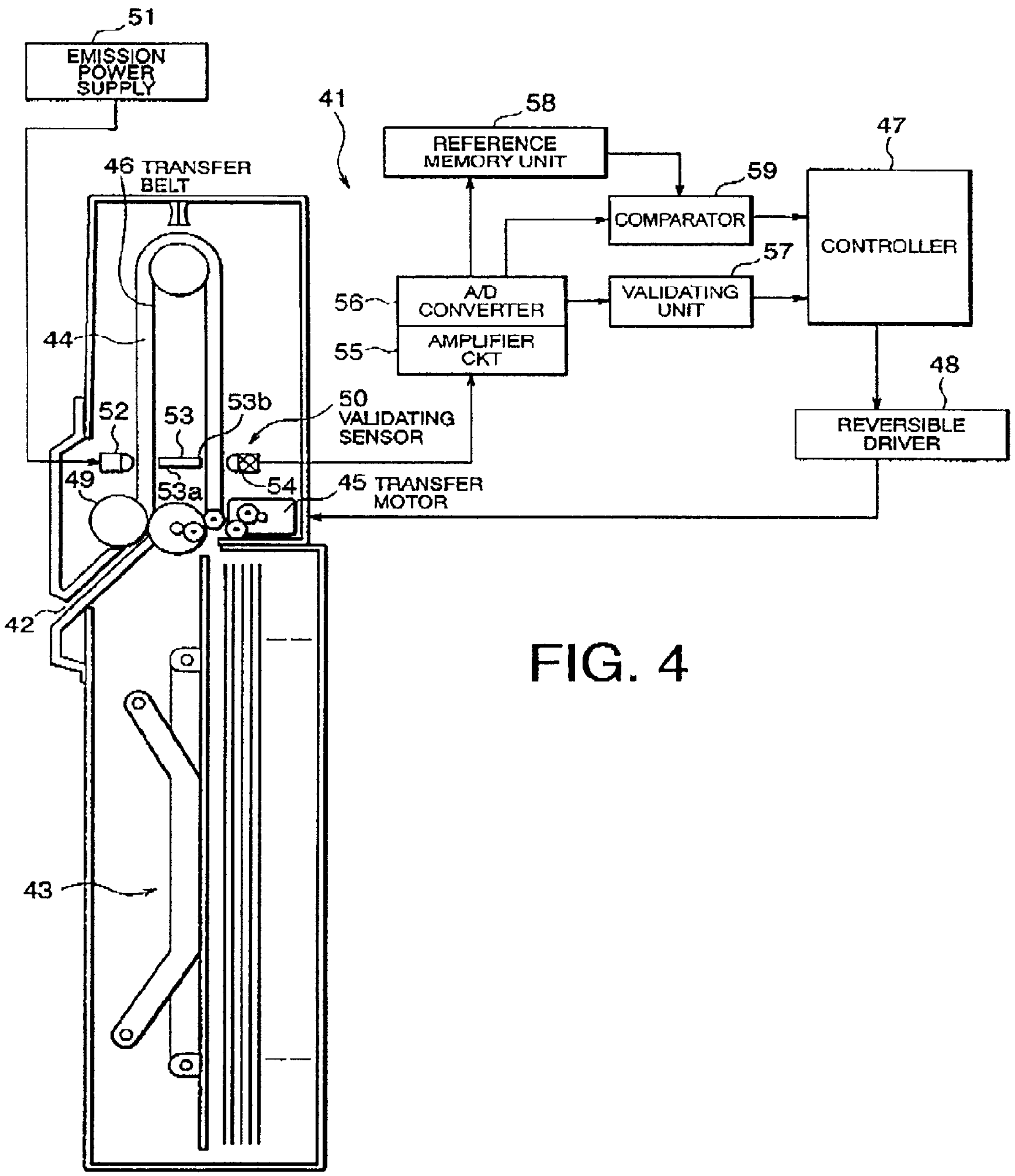
FIG. 4 shows a bill validator according to a third embodiment of this invention.
Figure 5:
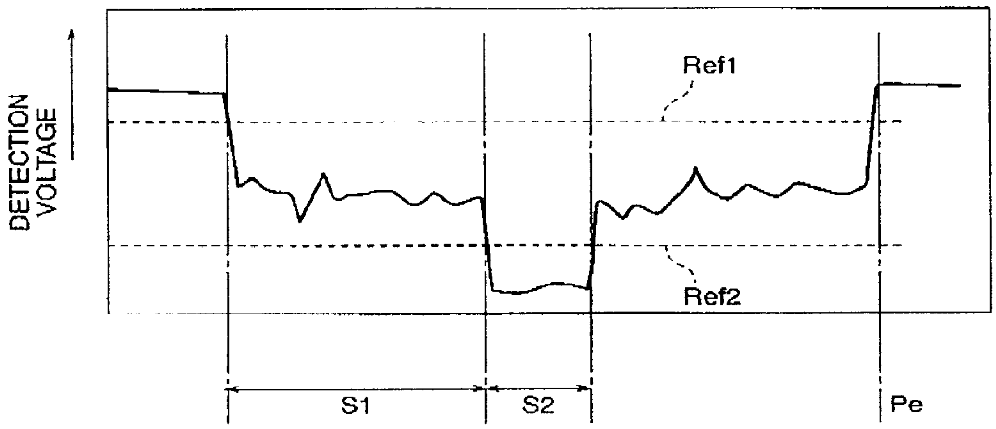
FIG. 5 shows a characteristic chart representing a transition of a transmission light detection voltage in a normal state.

Referring to FIGS. 4 and 5, a bill validator 41 according to a third embodiment of this invention comprises an optical detecting section as bill validating means or bill insertion detecting/validating means.

Referring to FIG. 4, the bill validator 41 has a bill inlet 42 and a valid bill storage section 43. A bill transfer path 44 has an inverted U shape and is provided with a transfer belt 46 driven by a transfer motor 45 to be circulated. The transfer motor 45 is rotated in a forward or a reverse direction through a reversible driver 48 controlled by a controller 47. Behind the inlet 42, a guide roller 49 is arranged to clamp the bill in cooperation with a start end of the transfer belt 46.

The bill validator 41 comprises a bill validating sensor (also serving as an optical detecting section) 50. The validating sensor 50 comprises a light emitting element 52 as a light emitting portion energized by an emission power supply 51 to emit a light beam, a transmission light guide 53 having one end provided with a light input portion 53*a* supplied with the light beam from the light emitting element 52 and the other end provided with a light output portion 53*b*, and a light receiving element 54 as a light receiving portion for receiving the light beam from the light output portion 53*b*. The light receiving element 54 produces a detection voltage signal representative of a transmission light detection voltage and delivers the detection voltage signal to an amplifier circuit 55. The amplifier circuit 55 amplifies the detection voltage signal into an amplified detection signal and sends the amplified detection signal to an A/D converter 56. The A/D converter 56 converts the amplified detection signal into a digital detection signal and supplies the digital detection signal to a validating unit 57, a reference memory unit 58, and a comparator 69. The validating unit 57 judges whether the bill is valid or invalid in the manner similar to the foregoing embodiments and produces a judgment result signal to the controller 47. The reference memory unit 58 memorizes the digital detection signal. The comparator 59 compares each reference level memorized at that time and the digital detection signal.

Referring to FIG. 5, an abscissa and an ordinate represent a bill transfer amount and the transmission light detection voltage detected by the light receiving element 54, respectively, when the bill is transferred in the bill validator 41. When the bill normally reaches the validating sensor 50, the transmission light detection voltage is lower than the first reference level Ref1 and higher than the second reference level Ref2. For a predetermined transfer period (or a first period) S1, the above-mentioned state is maintained. The fist period S1 is a period until the forward end of the bill 2 reaches a space between the transmission light guide 53 and the light receiving element 54 after the forward end of the bill 2 passes a space between the light emitting element 52 and the transmission light guide 53. The fist period S1 is followed by a second period S2 which is another period until the rear end of the bill 2 passes the space between the light emitting element 52 and the transmission light guide 53 after the forward end of the bill 2 reaches the space between the transmission light guide 53 and the light receiving element 54.

However, if two bills in an overlapped state are inserted or if an invalid bill thick in paper quality is inserted, the transmission light detection voltage immediately drops from the saturation voltage level Vs to a level lower than the second reference level Ref2. In this event, insertion of an abnormal object is judged and the abnormal object is returned.

If the bill is judged valid, the transmission light detection voltage follows the transition illustrated in FIG. 5. The position Pe is a point where the rear end of the bill passes the space between the transmission light guide 53 and the light receiving element 54. When the rear end of the bill reaches this point, the controller 47 delivers a stop signal to the reversible driver 48 to stop the transfer motor 45. Then, the validating unit 57 judges whether or not the bill is valid. If "valid" is judged, the second reference level Ref2 can be updated as follows:

$$Ref2=(V'1+V2)/2,$$

where V'1 and V'2 represent averages of the transmission light detection voltages for first and second periods S1 and S2, respectively. The second reference level Ref2 can be updated every time when the validation is carried out or at any appropriate timing in the manner similar to the second embodiment.

Thus, in this embodiment, the validating sensor 50 detects whether the bill is valid or invalid and whether the bill is normally inserted or not can be accurately detected and judged.

As described above, in the bill validator of this invention illustrated in FIG. 2A, the overlapped state can be accurately detected by the optical detecting section as the bill insertion detecting means. In addition, the overlapped state can be detected in an early stage so that jamming of the bill or bills is effectively avoided. Furthermore, the information about the position of the bill is obtained at two points more reliably than one point in the device of FIG. 1. Therefore, when the bill is inserted, it is possible to detect that the bill is securely clamped. When the bill is returned, the bill can be stopped at a position where the bill is lightly clamped at its end. Thus, the bill is prevented from falling out.

With the structure illustrated in FIG. 3A or 4, the second reference level Ref2 can be determined with reference to attenuation levels of the transmission light through one bill and two bills. Thus, on the basis of the actual measurement, the second reference level Ref2 can be determined at an optimum level. The optimum level can be updated so that the detection of overlapped state can be accurately carried out. In particular, such updating is effective against deterioration of the optical section due to aging.

Summarizing the bill validator illustrated in FIG. 4, the bill validator includes a bill inlet (42) through which a bill is inserted, a transfer path (44) arranged behind the inlet and connected to the inlet, a transferring mechanism for transferring the bill in the transfer path, a validating unit (55–57) for validating the bill on a predetermined validating position of the transfer path, and an optical detecting section (60).

The optical detecting section (50) includes a light emitting portion (52) for emitting a light beam, a transmission light guide (53) having a light input portion (53*a*) supplied with the light beam from the light emitting portion and a light output portion (53*b*) for outputting the light beam inputted through the light input portion, and a light receiving portion (54) for receiving the light beam from the light output portion. The light input and the light output portions of the transmission light guide are faced to the light emitting portion and the light receiving portion, respectively, with a first position of the transfer path interposed between the light input portion of the transmission light guide and the light emitting portion and with a second position of the transfer path interposed between the light output portion of the transmission light guide and the light receiving portion. The second position of the transfer path is different from the first position of the transfer path.

In this case, the second position of the transfer path is coincident with the predetermined validating position of the transfer path. In this event, the validating unit (55–57) is for validating the bill on the second position of the transfer path on the basis of an output signal of the light receiving portion (54).

The light receiving portion detects as a transmission light beam the light beam transmitted through the bill to produce a detection voltage signal representative of a transmission light detection voltage. The optical detecting section is designed so that the transmission light detection voltage has a maximum voltage level in a standby state where the bill is not yet inserted, an intermediate voltage level in a first stage where the transmission light beam passes through the bill once, and a minimum voltage level in a second stage where the transmission light beam passes through the bill twice. The intermediate voltage level is lower than the maximum voltage level and higher than the minimum voltage level. The bill validator further includes a detecting and judging portion (58, 59) for detecting and judging the maximum voltage level, the intermediate voltage level, and the minimum voltage level.

An overlapped state is judged if it is detected that the maximum voltage level in the standby state is immediately followed by the minimum voltage level without experiencing the intermediate voltage level when the bill is inserted in the transfer path through the bill inlet.

What is claimed is:

1. A bill validator comprising a bill inlet through which a bill is inserted, a transfer path arranged behind said inlet and connected to said inlet, a transferring mechanism for transferring said bill in a bill transfer direction along said transfer path, a validating unit for validating said bill by judging whether said bill is valid or invalid, said validating unit being positioned at a predetermined validating position on said transfer path, and an optical detecting section comprising a light emitting portion for emitting a light beam, a transmission light guide having a light input portion supplied with the light beam from said light emitting portion and a light output portion for outputting the light beam inputted through said light input portion, and a light receiving portion for receiving the light beam from said light output portion, said light input and said light output portions of said transmission light guide being faced to said light emitting portion and said light receiving portion, respectively, with a first position of said transfer path interposed between the light input portion of said transmission light guide and said light emitting portion and with a second position of said transfer path interposed between the light output portion of said transmission light guide and said light receiving portion, said second position of the transfer path being spaced from said first position of the transfer path in said bill transfer direction.

2. A bill validator as claimed in claim 1, wherein said first and said second positions of the transfer path are nearer to said bill inlet than said predetermined validating position of the transfer path.

3. A bill validator as claimed in claim 2, wherein said light receiving portion detects as a transmission light beam the light beam transmitted through said bill to produce a detection voltage signal representative of a transmission light detection voltage, said optical detecting section being designed so that said transmission light detection voltage has a maximum voltage level in a standby state where said bill is not yet inserted, an intermediate voltage level in a first stage where said transmission light beam passes through said bill once, and a minimum voltage level in a second stage where said transmission light beam passes through said bill twice, said intermediate voltage level being lower than said maximum voltage level and higher than said minimum voltage level, said bill validator further comprising a detecting and judging portion for detecting and judging said maximum voltage level, said intermediate voltage level, and said minimum voltage level.

4. A bill validator as claimed in claim 3, wherein an overlapped state is judged if it is detected that said maximum voltage level in said standby state is immediately followed by said minimum voltage level without experiencing said intermediate voltage level when said bill is inserted in said transfer path through said bill inlet.

5. A bill validator as claimed in claim 1, wherein said first position of the transfer path is nearer to said bill inlet than said second position of the transfer path, said second position of the transfer path being coincident with said predetermined validating position of the transfer path.

6. A bill validator as claimed in claim 5, wherein said light receiving portion detects as a transmission light beam the light beam transmitted through said bill to produce a detection voltage signal representative of a transmission light detection voltage, said optical detecting section being designed so that said transmission light detection voltage has a maximum voltage level in a standby state where said bill is not yet inserted, an intermediate voltage level in a first stage where said transmission light beam passes through said bill once, and a minimum voltage level in a second stage where said transmission light beam passes through said bill twice, said intermediate voltage level being lower than said maximum voltage level and higher than said minimum voltage level, said bill validator further comprising a detecting and judging portion for detecting and judging said maximum voltage level, said intermediate voltage level, and said minimum voltage level.

7. A bill validator as claimed in claim 6, wherein an overlapped state is judged if it is detected that said maximum voltage level in said standby state is immediately followed by said minimum voltage level without experiencing said intermediate voltage level when said bill is inserted in said transfer path through said bill inlet.

8. A bill validator as claimed in claim 6, wherein said validating unit is for validating said bill on said second position of the transfer path on the basis of an output signal of said light receiving portion.

9. A bill validator as claimed in claim 1, wherein said second position of the transfer path is coincident with said predetermined validating position of the transfer path.

10. A bill validator as claimed in claim 9, wherein said light receiving portion detects as a transmission light beam the light beam transmitted through said bill to produce a detection voltage signal representative of a transmission light detection voltage, said optical detecting section being designed so that said transmission light detection voltage has a maximum voltage level in a standby state where said bill is not yet inserted, an intermediate voltage level in a first stage where said transmission light beam passes through said bill once, and a minimum voltage level in a second stage where said transmission light beam passes through said bill twice, said intermediate voltage level being lower than said maximum voltage level and higher than said minimum voltage level, said bill validator further comprising a detecting and judging portion for detecting and judging said maximum voltage level, said intermediate voltage level, and said minimum voltage level.

11. A bill validator as claimed in claim 10, wherein an overlapped state is judged if it is detected that said maximum voltage level in said standby state is immediately followed by said minimum voltage level without experiencing said intermediate voltage level when said bill is inserted in said transfer path through said bill inlet.

12. A bill validator as claimed in claim 9, wherein said validating unit is for validating said bill on said second position of the transfer path on the basis of an output signal of said light receiving portion.

* * * * *